United States Patent [19]

Fujioka

[11] Patent Number: 4,849,840
[45] Date of Patent: Jul. 18, 1989

[54] CARRIAGE DEVICE FOR FLOPPY DISK APPARATUS HAVING HEAD ARM WITH REGULATING MATERIAL

[75] Inventor: Toshiyuki Fujioka, Tokyo, Japan

[73] Assignee: Kabushiki Kaisha Toshiba, Kawasaki, Japan

[21] Appl. No.: 31,270

[22] Filed: Mar. 30, 1987

[30] Foreign Application Priority Data

Mar. 31, 1986 [JP] Japan .................................. 61-71171

[51] Int. Cl.$^4$ ........................... G11B 5/48; G11B 21/16
[52] U.S. Cl. ................................. 360/104; 318/634; 360/106
[58] Field of Search ..................... 360/109, 104–106, 360/97, 99; 318/634

[56] References Cited

U.S. PATENT DOCUMENTS

| 4,348,624 | 9/1982 | Anderson et al. | 318/634 |
| 4,524,400 | 6/1985 | Cantwell | 360/109 |
| 4,578,726 | 3/1986 | Boehm et al. | 360/106 |
| 4,602,305 | 7/1986 | Ghose | 360/97 |
| 4,719,692 | 1/1988 | Sakai et al. | 360/104 |

FOREIGN PATENT DOCUMENTS

| 0198569 | 11/1984 | Japan | 360/109 |
| 0224154 | 11/1985 | Japan | 360/109 |

OTHER PUBLICATIONS

D. Proper, "Head Arm Support", IBM TDB, Jul. 1979, vol. 22, No. 2, p. 503.

*Primary Examiner*—Stuart N. Hecker
*Assistant Examiner*—David J. Severin
*Attorney, Agent, or Firm*—Oblon, Spivak, McClelland, Maier & Neustadt

[57] ABSTRACT

A carriage device of a floppy disk apparatus includes a carriage main body arranged for linear movement and a head arm extending parallel to the main body. The body and arm are formed of synthetic resin. First and second magnetic heads are respectively mounted on the main body and head arm, so as to oppose each other. Regulating members are fixed to the main body and head arm, to prevent expansion and contraction thereof. Each regulating member is made of a material having a thermal expansion coefficient and hygroscopicity lower than those of the synthetic resin.

7 Claims, 3 Drawing Sheets

CARRIAGE DEVICE FOR FLOPPY DISK APPARATUS HAVING HEAD ARM WITH REGULATING MATERIAL

BACKGROUND OF THE INVENTION

The present invention relates to a carriage device of a floppy disk apparatus, for supporting a magnetic heads.

In a floppy disk apparatus, a magnetic head performs a seek operation on a magnetic recording medium, so as to find a desired track, and once found performs a data read/write operation thereon. The magnetic head is placed on a carriage, and the carriage is linearly moved to enable the magnetic head to perform the seek operation. Normally, the carriage has a pair of parallel arms, and magnetic heads are mounted on the distal ends of the respective arms. These heads oppose each other at a predetermined interval.

A carriage has recently been developed which is made of a resin material such as polycarbonate filled with glass. This is because a disk apparatus can be made light in weight and because a resin material is easy to work. On the other hand, a resin material has a relatively high thermal expansion coefficient and high hygroscopicity. Consequently, the carriage tends to contract or expand when changes occur in temperature and humidity. When the carriage contracts or expands, the position of the magnetic heads is displaced, thereby degrading the positioning accuracy of the magnetic heads during the seek operation, and resulting in an erroneous operation. In recent years especially, since the interval between tracks has been greatly decreased, in order to increase the recording density of the magnetic recording medium, the merest expansion or contraction can adversely affect the positioning accuracy of the magnetic head.

In addition, when one of the pair of arms of the carriage expands or contracts different rate than the other, the interval between the magnetic heads thus varies and poses the same problem as described above.

SUMMARY OF THE INVENTION

The present invention has been conceived in consideration of the above situation, and has as its object to provide a carriage device which can minimize expansion or contraction caused by changes in temperature or humidity, so as to enable a magnetic head to be positioned with high accuracy.

In order to achieve the above object, a carriage device according to the present invention comprises a carriage main body arranged for linear movement, first and second head arms made of a synthetic resin, supported by the carriage main body and extending parallel to each other, a magnetic head mounted on one of the head arms, and a regulating member, attached to the head ar on which the magnetic head in mounted, for preventing expansion and contraction thereof, the regulating member being made of a material having a thermal expansion coefficient and hygroscopicity lower than those of the synthetic resin.

BRIEF DESCRIPTION OF THE DRAWINGS

FIGS. 1 to 3 show a carriage device according to an embodiment of the present invention, in which FIG. 1 is a perspective view, FIG. 2 is a side view, and FIG. 3 is a plan view;

DETAILED DESCRIPTION OF THE PREFERRED EMBODIMENTS

Preferred embodiments of the present invention will be described in detail, with reference to the accompanying drawings.

Figure 1:
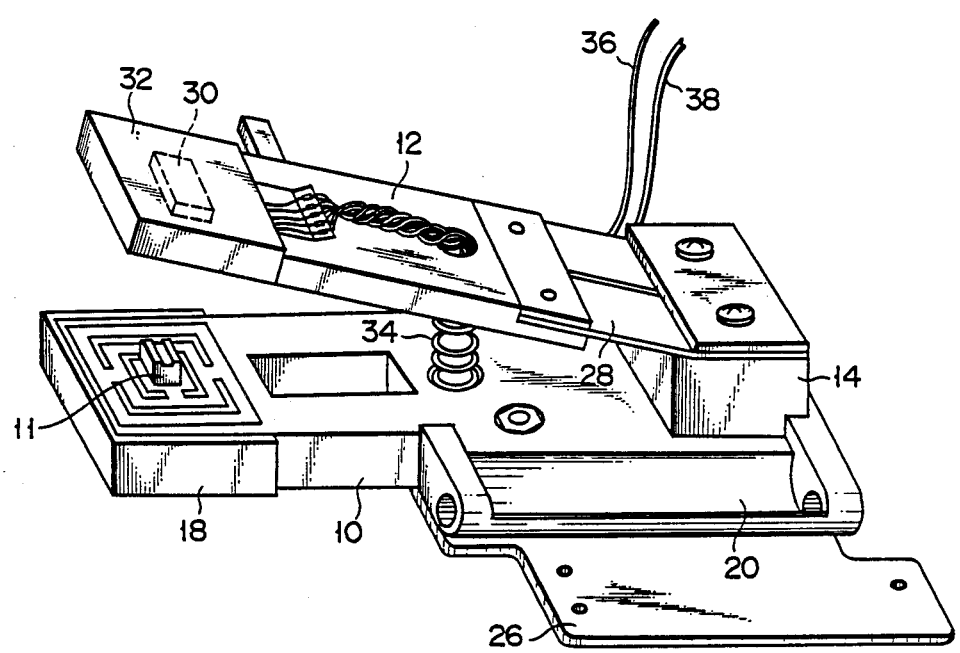
Figure 2:
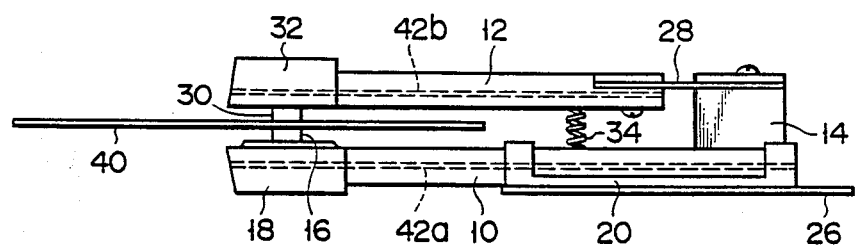
Figure 3:
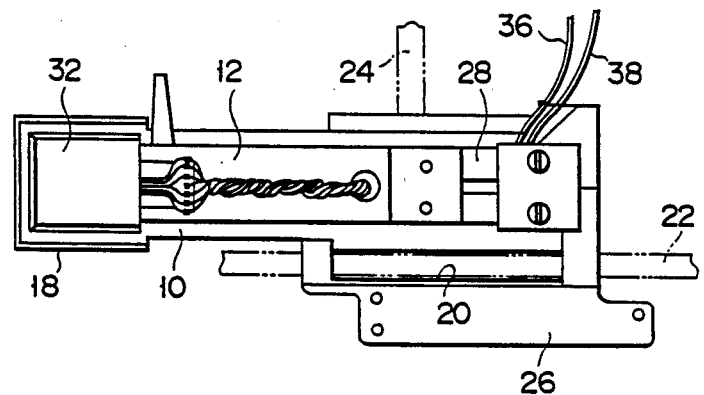

As is shown in FIGS. 1 to 3, a carriage device includes elongated plate-like carriage main body 10 and elongated plate-like head arm 12 arranged parallel to body 10.

Support 14 is formed on the proximal end upper surface of body 10, and first magnetic head (S0 head) 16 is mounted on the distal end upper surface of body 10. To be more precise, body 10 also serves as a head arm for supporting the magnetic head. The distal end outer surface of body 10 is covered with magnetic shield cover 18. Guide hole 20 is formed at one side portion of body 10, so as to extend along the longitudinal direction thereof, and a guide groove (not shown) is formed at the other side portion, so as to extend parallel to hole 20. As indicated by two dots and dash line in FIG. 3, guide rail 22 is inserted into hole 20, and auxiliary guide 24 is inserted into the guide groove. Thus, body 10 can move linearly along rail 22, i.e., in the longitudinal direction of body 10.

Base plate 26 is fixed to the lower surface of body 10 and projects outwardly therefrom. A converting mechanism (e.g., a steel belt mechanism or a lead screw mechanism), is provided on plate 26 so as to convert the rotational force of a drive source, such as a stepping motor, into linear movement and transmit it to body 10.

The proximal end of arm 12 is fixed to support 14 of body 10, by means of leaf springs 28. Therefore, arm 12 opposes body 10 and is movable in the directions close to and away from body 10, by way of the elastic deformation of springs 28. Second magnetic head (S1 head) 30 is mounted on the distal end lower surface of arm 12, and opposes first head 16. Note that the magnetic gaps of heads 16 and 30 are separated deviate from each other by a predetermined interval in the direction of movement of body 10, i.e., in the longitudinal direction thereof. The distal end outer surface of arm 12 is covered with magnetic shield cover 32. Compression coil spring 34 is provided between body 10 and arm 12, and arm 12 is biased by spring 28 to enable it to move close to body 10.

In FIGS. 1 to 3, reference numerals 36 and 38 respectively denote lead wires connected to heads 16 and 30, and reference numeral 40 denotes a floppy disk.

Body 10 and arm 12 are both made of a synthetic resin such as polycarbonate filled with glass which has a relatively high thermal expansion coefficient and high hygroscopicity. Elongated rod-like regulating members 42a and 42b are respectively buried in body 10 and arm 12. Members 42a and 42b are made of a material such as an amber alloy which has a thermal expansion coefficient and hygroscopicity smaller than those of the material of body 10 and arm 12. Member 42a extends from the proximal end to the distal end of body 10, along the extending direction thereof, i.e., along the direction of movement of the carriage. Similarly, member 42b extends along the entire length of arm 12. Members 42a and 42b are respectively incorporated inside body 10 and arm 12 during the formation of the latter.

When, in the carriage apparatus having the above structure, a driving force produced by the stepping motor (not shown) is transmitted to body 10 via the converting mechanism, body 10 and arm 12 are moved linearly along rail 22, whereby heads 16 and 30 perform a seek operation in a radial fashion, in relation to floppy disk 40.

The carriage apparatus having the above structure has the following advantage:

A floppy disk apparatus is normally designed for use under the conditions of 5 to 45° C. and 20 to 80% humidity. However, body 10 and arm 12, which are made of a synthetic resin, expand or contract in accordance with changes in temperature and humidity. Because body 10 and arm 12 incorporated regulating members therein, which are made of a material having a thermal expansion coefficient and hygroscopicity lower than those of the synthetic resin, any expansion or contraction of body 10 and arm 12, especially along their extending direction, is thus restricted. Therefore, even when changes in temperature or humidity occur, displacement of first and second magnetic heads can be minimized. As a result, in all cases, the magnetic heads can be positioned with high accuracy during the seek operation, with the result that the read/write operation can be performed comectly every time.

Figure 4:
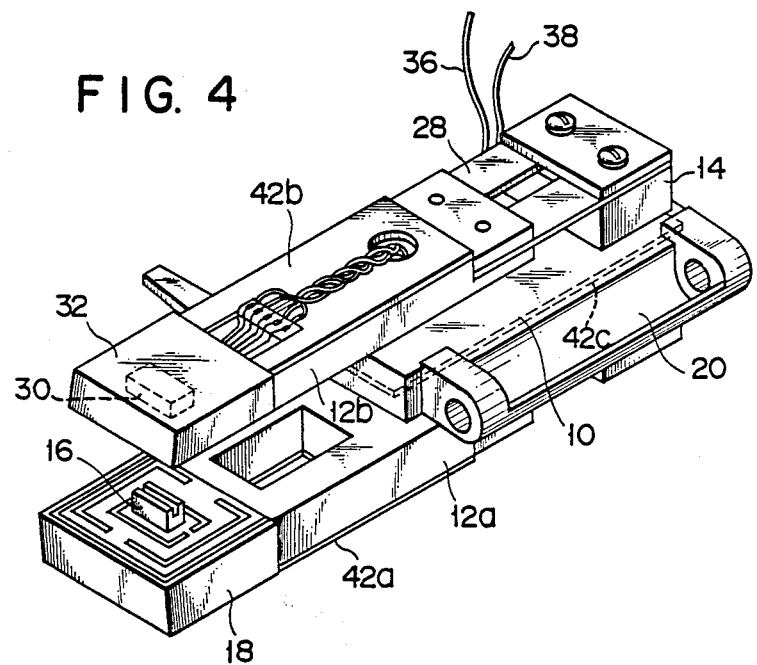
FIG. 4 is a perspective view of a carriage device according to a of the present invention.

FIG. 4 shows a second embodiment of the present invention.

According to the second embodiment, carriage main body 10 is formed independently from the head arm. More precisely, the carriage device includes body 10, and first and second head arms 12a and 12b supported by body 10. Arms 12a and 12b are mounted on body 10 by means of leaf springs 28, and oppose each other. First and second magnetic heads 16 and 30 are fixed to the distal ends of arms 12a and 12b, respectively. Arms 12a and 12b are biased by springs (not shown), so as to be able to move close to each other.

According to the second embodiment, plate-like regulating members 42a and 42b are respectively adhered to the outer surfaces of the corresponding head arms. In addition, regulating member 42c is buried in body 10. Each regulating member extends along the extending direction of body 10 and throughout its length.

The carriage apparatus having the above structure can achieve the same advantage as in the first embodiment described above.

Figure 5:
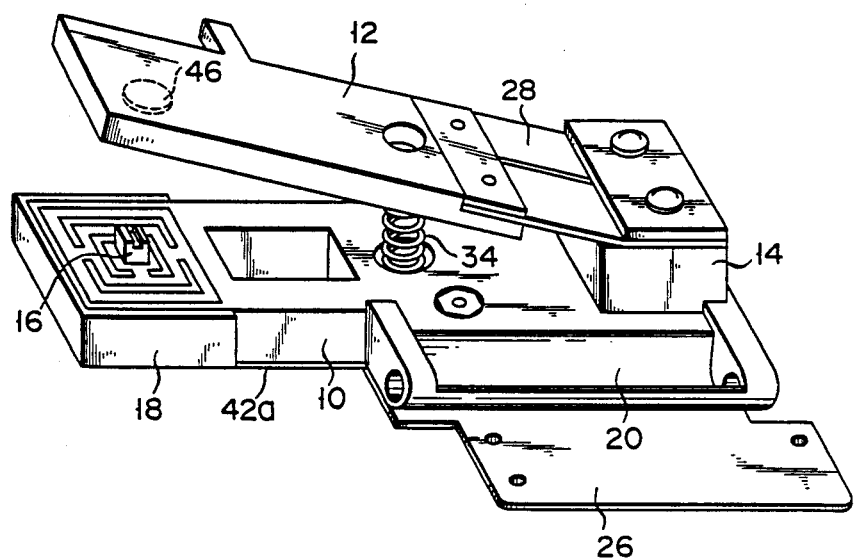
FIG. 5 is a perspective of a carriage device according to a third embodiment of the present invention.

FIG. 5 shows a third embodiment of the invention.

In this embodiment, instead of magnetic head 30, pad 46 is mounted on the distal end of head arm 12 so as to oppose magnetic head 16 mounted on main body 10. Plate-like regulating member 42a is adhered to the lower surface of main body 10. Member 42a extends along the extending direction of body 10 and throughout its length. In this embodiment, it is not necessary to fix a regulating member to head arm 12.

Note that the present invention is not limited to the above embodiments, but can be modified without departing from the spirit and scope thereof.

A material constituting the regulating members need only have a thermal expansion coefficient and hygroscopicity which is lower than those of a material constituting the head arm and the carriage main body, so that other materials, for example, aluminum alloy, may be used. In addition, in the above embodiments, the regulating members extend throughout the length of the head arm and the carriage main body. However, even if the regulating members are provided at only part of the head arm and the carriage main body, a similar effect can be obtained to some extent.

What is claimed is:

1. A carriage device for a floppy disk apparatus, comprising:
   a carriage main body arranged for linear movement;
   first and second elongate head arms of a synthetic resin, supported by the carriage main body, and extending parallel to each other;
   a magnetic head mounted on one of the head arms; and
   regulating members fixed to the head arms, respectively, and extending in the direction of elongation of the head arm, said regulating members comprising means extending along a substantial portion of the length of the head arms for reinforcing the head arms and preventing expansion and contraction thereof, the regulating members being made of a material having a thermal expansion coefficient and hygroscopicity lower than those of the synthetic resin.

2. A device according to claim 1, wherein said first and second head arms extend along the direction of movement of the carriage main body, and said regulating members extend along the entire extending length of the head arms.

3. A device according to claim 1, wherein said carriage main body is formed integrally with one of the head arms.

4. A device according to claim 1, which further comprises another magnetic head mounted on the other head arm, so as to oppose the magnetic head.

5. A device according to claim 4, wherein said regulating members are made of an amber alloy.

6. A device according to claim 4, wherein each of said regulating membes is formed in a plate-like shape and fixed to the surface of the corresponding head arm.

7. A device according to claim 4, wherein each of said regulating members is buried in the corresponding head arm. INSERT B1, Page 6 which has a relatively high thermal expansion coefficient and high hygroscopicity

* * * * *